(12) United States Patent
Bonneau et al.

(10) Patent No.: US 6,834,282 B1
(45) Date of Patent: Dec. 21, 2004

(54) LOGICAL AND CONSTRAINT BASED BROWSE HIERARCHY WITH PROPAGATION FEATURES

(75) Inventors: Scott Bonneau, Austin, TX (US); Michael Nonemacher, Austin, TX (US); Jeremy Weinrib, Austin, TX (US)

(73) Assignee: Trilogy Development Group, Inc., Austin, TX (US)

( * ) Notice: Subject to any disclaimer, the term of this patent is extended or adjusted under 35 U.S.C. 154(b) by 729 days.

(21) Appl. No.: 09/884,180

(22) Filed: Jun. 18, 2001

(51) Int. Cl.$^7$ .............................................. G06F 7/00
(52) U.S. Cl. .......................... 707/100; 705/27; 345/853
(58) Field of Search .................... 707/1–10, 100–104.1; 705/27; 345/853, 854

(56) References Cited

U.S. PATENT DOCUMENTS

| | | | | |
|---|---|---|---|---|
| 5,701,137 | A | * 12/1997 | Kiernan et al. | 345/853 |
| 5,715,444 | A | * 2/1998 | Danish et al. | 707/4 |
| 5,737,732 | A | * 4/1998 | Gibson et al. | 707/2 |
| 5,740,425 | A | * 4/1998 | Povilus | 707/100 |
| 5,806,066 | A | 9/1998 | Golshani et al. | 707/100 |
| 5,812,135 | A | * 9/1998 | Kotchey | 345/853 |
| 5,870,717 | A | 2/1999 | Wiecha | 705/26 |
| 5,878,400 | A | 3/1999 | Carter, III | 705/20 |
| 5,970,475 | A | 10/1999 | Barnes et al. | 705/27 |
| 5,995,939 | A | 11/1999 | Berman et al. | 705/3 |
| 6,006,216 | A | 12/1999 | Griffin et al. | 707/2 |
| 6,055,515 | A | * 4/2000 | Consentino et al. | 705/27 |
| 6,154,750 | A | * 11/2000 | Roberge et al. | 707/104.1 |
| 6,381,611 | B1 | * 4/2002 | Roberge et al. | 707/104.1 |
| 6,442,541 | B1 | 8/2002 | Clark et al. | 707/3 |
| 6,578,030 | B1 | 6/2003 | Wilmsen et al. | 707/3 |
| 2003/0085931 | A1 | * 5/2003 | Card et al. | 345/853 |

OTHER PUBLICATIONS

Aggarwal et al., "Search Product Catalogs," U.S. patent application Publication No. 2002/0138481 A1, Sep. 26, 2002, pp. 1–13.

* cited by examiner

Primary Examiner—St. John Courtenay, III
(74) Attorney, Agent, or Firm—Hamilton & Terrile, LLP; Kent B. Chambers (57) ABSTRACT

A logical and constraint-based hierarchical approach provides a highly flexible and expressive way in which to browse items stored in a database. The logical and constraint-based approach permits a user to create an arbitrary number of hierarchical representations of the items in a database. The approach permits items to be logically grouped on one level and grouped based on attribute/value constraints on the next. The hierarchical representation consists of nodes that are related to one another in a tree-like structure starting with a root node. Each node has a unique label, preferably indicative of the items in the database that it represents. Each node has a list of the labels of the nodes that are its children. Each node can only be the child of one parent node. Nodes may optionally express constraints based on attributes and their values that serve to define the scope of database items that fall under the node in the hierarchy. Each node inherits the constraints of its ancestors and therefore the scope of items in a database that that fall underneath a given node are defined by the aggregation of the constraints from the given node up to and including the root. A node that does not specify constraints instead specifies a logical grouping of items that cannot be specified by one or more constraints. The constraints are implicitly ANDed together in the aggregate. A logical grouping represents the equivalent of a logical ORing of constraints, but without the need for specifying attribute values or performing the function. A user browsing a database using the hierarchy triggers a search of the database by selecting one of the leaf nodes in the hierarchy. The constraints are aggregated and a rule is established that includes all of the database items that meet the aggregation of constraints. A database query is derived from the rule, and the database is searched for all items that meet the aggregated constraints. A set of items is returned and displayed for the user.

23 Claims, 4 Drawing Sheets

LOGICAL AND CONSTRAINT BASED BROWSE HIERARCHY WITH PROPAGATION FEATURES

CROSS REFERENCE TO RELATED APPLICATIONS

This application relates to application Ser. No. 09/884,179, filed on same day herewith, entitled "Rules Based Provision of Custom Pricing for Multiple Entities" and naming Scott Bonneau, Michael Nonemacher and Jeremy Weinrib as inventors, the application being incorporated herein by reference in its entirety.

This application relates to application Ser. No. 09/884,216, filed on same day herewith, entitled "Rules Based Custom Catalogs Generated from a Central Catalog Database for Multiple Entities" and naming Scott Bonneau, Michael Nonemacher and Jeremy Weinrib as inventors, the application being incorporated herein by reference in its entirety.

This application relates to application Ser. No. 09/884,375, filed on same day herewith, entitled "Browse Hierarchies Customized for Rules Based Custom Catalogs" and naming Scott Bonneau, Michael Nonemacher and Jeremy Weinrib as inventors, the application being incorporated herein by reference in its entirety.

This application relates to application Ser. No. 09/886,691, filed on same day herewith, entitled "A Method For Building Digital Databases Optimized For Maintenance, Descriptiveness, And Fast Search" and naming Scott Bonneau and Michael Nonemacher as inventors, the application being incorporated herein by reference in its entirety.

BACKGROUND OF THE INVENTION

1. Field of the Invention

The present invention relates to browsing on-line catalogs and web sites, and more specifically to a flexible and arbitrarily expressive rules-based browsing hierarchy for on-line catalogs and web sites.

2. Description of the Related Art

With the advent of Internet based commerce, organizations on both the buy and sell side of business-to-business (B2B) procurement relationships have sought to harness computer networks as a means for automating the procurement process between them. To facilitate e-commerce, and particularly e-procurement, suppliers of goods and services have developed electronic catalogs by which potential buyers can receive and display information regarding the goods and services offered by the seller, including descriptive information, pictures and prices.

One issue confronted by sellers offering goods and services for sale over the Internet, whether through electronic catalogs or a web site, is how to present their product information to a buyer. One simple approach is to mimic a user's interaction with a paper catalog. This approach involves presenting the buyer with a sequence of catalog pages displayed on the buyer's computer screen, each page consisting of descriptive data in the form of text and images that cover some number of items being offered by the seller. Using this technique for catalogs containing a large number of items will likely require the buyer to browse too many pages to find the items in which the user is interested. For a catalog or web site with even a moderately expansive offering of items, this solution is not practicable. The buyer will probably lose interest before finding the item being sought, and the seller will lose a sale.

One way to make the browsing process more manageable is to organize the catalog items in the database into some form of hierarchy. The presentation created by the hierarchy should be expressive, and should guide the buyer through the catalog of product offerings (as stored in the database of the seller) to specific items of interest to the buyer with reasonable ease and flexibility. A hierarchy typically attempts to classify and/or categorize catalog items starting with relatively general levels of specificity, and gradually becomes more specific based on values of particular attributes associated with the items. Such a hierarchy can be thought of as a simple tree structure, with higher-order nodes representing more general classifications for the items, and lower-order nodes (i.e. the children of the more general nodes) representing a narrowing of the scope of items that occupy the lower levels of the hierarchy.

Figure 1A:
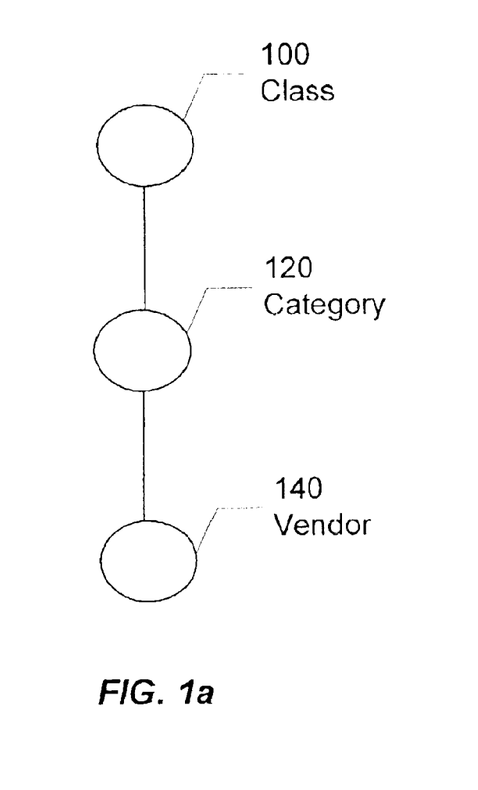
FIG. 1a shows a prior-art browsing hierarchy based on classification.

One way sellers have been known to hierarchically organize their catalog data for browsing is in accordance with a "classification-category-vendor" hierarchy. A simple representation of this hierarchy is illustrated in FIG. 1a. Imposing this hierarchy requires that products be stored in the database along with values for each of these three attributes. At the classification level 100, catalog items are split into some predetermined number of classes each represented by a unique class label. Each class node is then split at the category level 120 into some number of category nodes equal to the number of predetermined categories established under each class. The category nodes are then split at the vendor level 140 to create some number of vendor nodes under each category equal to the precise number of vendors supplying products in the category.

Figure 1B:
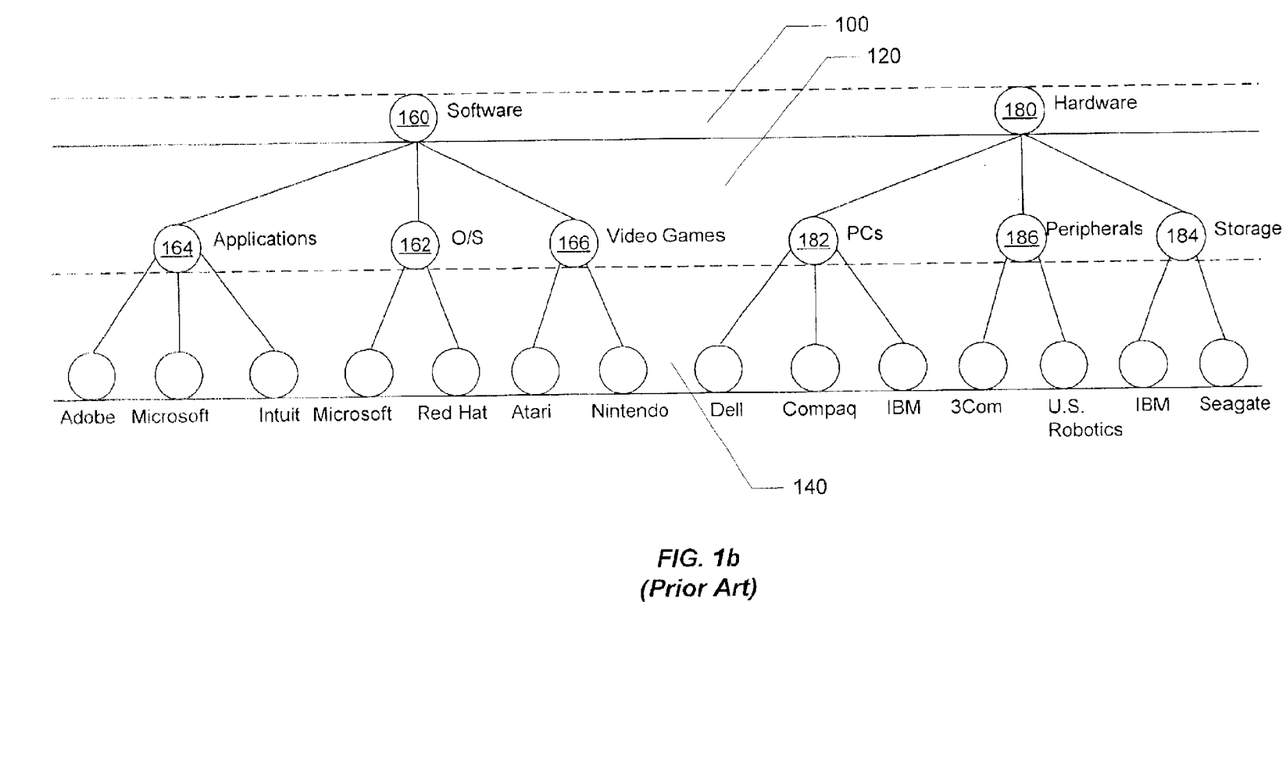

FIG. 1b is illustrates one possible example of a hierarchy that has been created in accordance with the model of FIG. 1a. In the example, the items in the catalog database are divided into two very general classes: hardware and software. Thus, the hierarchy of FIG. 1b reflects these classes with two nodes at the class level 100, one labeled as "hardware" 180 and one labeled as "software" 160. The class nodes are then split at the category level 120 into categories represented by the nodes "O/S (operating systems)" 162, "applications" 164 and "video games" 166. Under the "hardware" node 180, the categories might be "PCs (personal computers)" 182, "peripherals" 186, and "storage" 184. Finally, the nodes at the category level 120 are split at the vendor level 140 into a number of nodes representing the particular vendors supplying items from each category as illustrated.

Figure 1C:
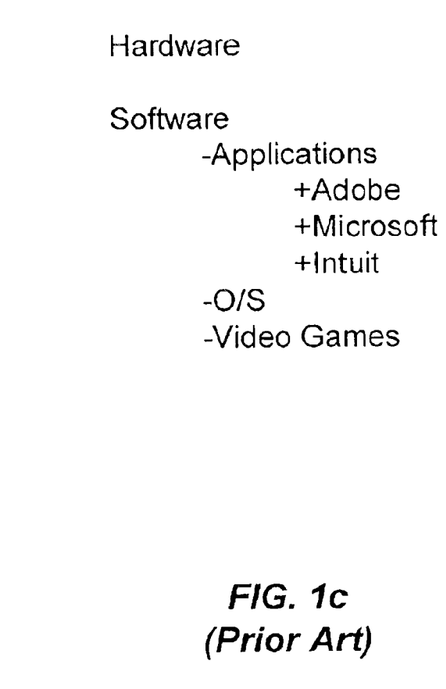
FIG. 1c shows an example of how the browsing hierarchy might be displayed to a user as the user browses a catalog in accordance with the prior-art hierarchy of FIG. 1b.

FIG. 1c illustrates the manner in which a seller might display this hierarchy in the form of hyperlinks on a web page displayed by a browser program. Typically, the top level is displayed first. If a user-buyer selects one of the classes, the categories are then displayed under the selected class in a manner that indicates they are children falling under the class (e.g. indented). Those of skill in the art will recognize that there a number of ways in which a user can select hyperlinks, including activating the link by clicking a button of a computer mouse. Selection of a category then causes the vendor choices to be displayed under the selected category. In FIG. 1c, the class node "Software" was selected, which led to the display of category nodes "Applications," "O/S" and "Video Games." The "Applications" node was then selected, leading to the display of vendor nodes "Adobe," "Microsoft" and "Intuit." Selecting the "Adobe" node will then typically retrieve all Adobe applications software products, and descriptive marketing text and images associated with those products.

The database consisting of the data for each item can be flat (i.e. the database has no physical hierarchy such that all of the items are at the same level). In this case, items fall into a particular one of the terminal nodes of the hierarchy (i.e. a node having no children of its own) based on the attribute values that are ascribed to that node of the hierarchy. In the alternative, the database itself may be physically ordered hierarchically, in which case the location into which an item is stored in the database implicitly dictates its position in the hierarchy, rather than expressly using the values of attributes stored with the items. While a hierarchically arranged database can be more economical in size because attribute values are implied rather than explicitly stored, sellers have been moving away from this approach. Requiring the ordering of the database in a certain manner removes even more flexibility from the seller with respect to how the hierarchy is employed. For example, a seller may wish to organize the hierarchy as "vendor-class-category" but would be restricted from doing so if the database was hierarchically ordered in the manner illustrated by FIG. 1a.

Either way, the foregoing approach is extremely inflexible because the expressiveness of the hierarchy is limited to that which has been preordained. Even if the depth of the hierarchy is expanded to include more levels of specificity, the navigational path by which each item is ultimately browsed is fixed, and so are the rules by which the hierarchy is organized. Put another way, each item can be browsed through exactly one path through the hierarchy because the manner in which the hierarchy is organized is predetermined.

Thus, it would be desirable to provide a more flexible and expressive browse hierarchy that permits the seller the freedom to organize the browsing hierarchy in an arbitrary manner. Such a hierarchy would even permit a user to browse the catalog data through multiple navigational paths to arrive at the same item because multiple instances of an item would be permitted to reside in the hierarchy. It would also be preferable for the hierarchy to be flexible enough to accommodate arbitrary logical groupings of catalog items or classifications of items that aren't necessarily tied together by some common set of attribute values stored in association with the items in the database.

SUMMARY OF THE INVENTION

The invention is a hierarchy for representing a plurality of catalog items stored in a catalog database. In one embodiment, the hierarchy includes a plurality of nodes each representative of some predefined subset of the items. Each of the nodes is a child of one other node, except for a root node, which is a child of no other node and is an ancestor of all of the nodes. Some of the nodes each specify one or more constraints defining a scope of the subset of items represented by each of the nodes. A second group of the nodes specifies no constraints, and each of the second portion of nodes establishes a logical grouping of items that logically defines a scope of the subset of the items represented by each of the second portion relative to the scope of items represented by its parent.

The constraints specified by the first portion of nodes are based on attributes associated with the items and a permissible range of values for those attributes. Each node in the hierarchy inherits all of the constraints of its ancestors along with any of its own constraints, and the aggregation of these constraints through a logical ANDing completely defines the scope of the items represented by the node.

Leaf nodes comprise a third portion of the nodes, and leaf nodes have no child nodes under them. The hierarchy can facilitate computer browsing of the database when the hierarchy is made available for display on a computer terminal. In one embodiment, the nodes are operable to be activated when selected by a computer mouse. In one embodiment, selecting a node other than a leaf node causes optional text associated with the selected node to be displayed. Further, activating a node also causes the display of the activated node's child nodes and renders them available for selection. Selecting a leaf node causes an aggregation of all constraints specified by the leaf node and its ancestors, and the formulation of a search rule that includes all items in the database that meets the aggregation of constraints. The search rule is then transmitted to a database server in the former of a search query that returns a list of the items from the database that belong to the subset represented by the leaf node. The list of items, and other collateral information is then returned to the computer terminal used to select the leaf node.

BRIEF DESCRIPTION OF THE DRAWINGS

The present invention may be better understood, and its numerous objectives, features and advantages made apparent to those skilled in the art by referencing the accompanying drawings. The use of the same reference number throughout the several figures designates a like or similar element.

FIG. 1b shows an example hierarchy based on the prior art hierarchy of FIG. 1a.

DETAILED DESCRIPTION

Overview

The method and apparatus for hierarchically representing items in a database provides a highly flexible and expressive catalog browsing hierarchy by which a buyer can navigate the items in a seller's catalog database. The seller can develop the hierarchy to be arbitrarily expressive and provide any number of navigational paths by which the buyer can navigate the seller's catalog to reach a particular item or set of items in the catalog.

In one embodiment, the seller's database is hierarchically flat and each product is represented by a unique SKU ID (identifier) in the catalog database. In this embodiment, each product belongs to exactly one product type. Unless an attribute is one that is deliberately made common to more than one product type, each attribute belongs to one product type and is identified by a unique attribute ID. Each product type is also uniquely identified with a product type ID. Those of skill in the art will recognize that the most common way to uniquely identify something in a table is with some form of alphanumeric identifier. Some examples of product type might be "personal computer (PC)," "memory," and "harddrive." Some examples of attributes that might be uniquely associated with such product types might be "processor clock speed," "memory size," "vendor" and "capacity" respectively. Catalog data typically consists of part specific data such as attribute value pairs. Examples are color=blue, size=64 k, processor speed=800 MHz, etc.

Each node in the hierarchy is associated with a unique label. Each node also contains a list of the labels for each of its child nodes (if any). Optionally, each node is associated with marketing text and image data, and may specify one or more constraints that require all items falling under the node to have specific values for certain item attributes. The constraints specified at a node are logically ANDed together, and are in effect logically ANDed with the constraints specified (if any) by all of the nodes that are its ancestors. Thus, any items that fall under a particular node in the hierarchy must meet al of the constraints by specified by the node itself, but also any constraints that are specified by its ancestors. Put another way, each node inherits the constraints of its ancestors. If a node does not specify any constraints, then it in effect specifies a logical grouping of items that could not otherwise be specified by an ANDed set of constraints. A logical grouping of items under a node is the equivalent of an implied logical ORing of constraints.

In one embodiment, whenever a leaf node is selected (i.e. activated), the constraints specified by the leaf node and all of its ancestors are ANDed together (i.e. aggregated) into a single rule that is used to generate a single query on the catalog database. The search returns a set of catalog items the scope of which is dictated by the aggregated constraints. The returned set of catalog items, along with marketing and image data associated with the items can then be displayed by the browser for the user's perusal. In one embodiment, the rule "includes" all items in the database that meet the aggregation of constraints. Those of skill in the art will recognize that the rule could instead be implemented as "excluding" all items meeting the constraint. Because a node specifying a logical grouping in effect specifies an implicit ORing of constraints by express assignment, the OR function does not have to be included in the database query and therefore executed by the database server. This makes the searching process significantly faster.

As previously mentioned, each of the nodes optionally can be associated with marketing text and image data related to the items defined by the node. When a user selects an interim (i.e. not a leaf) node in the hierarchy, the associated text and image data can be displayed along with the children of the selected node. This information may be more generalized information for items falling within the scope of the constraints specified by the node and its ancestors, or it could be remotely or not all related to the path taken by the user through the hierarchy.

Thus, a seller can arbitrarily define the scope of catalog items defined by any node, without regard to some predetermined hierarchy, provided that attributes are associated with the items or that a logical assignment can be made, sufficient to define the desired scope.

Structure

Figure 2:
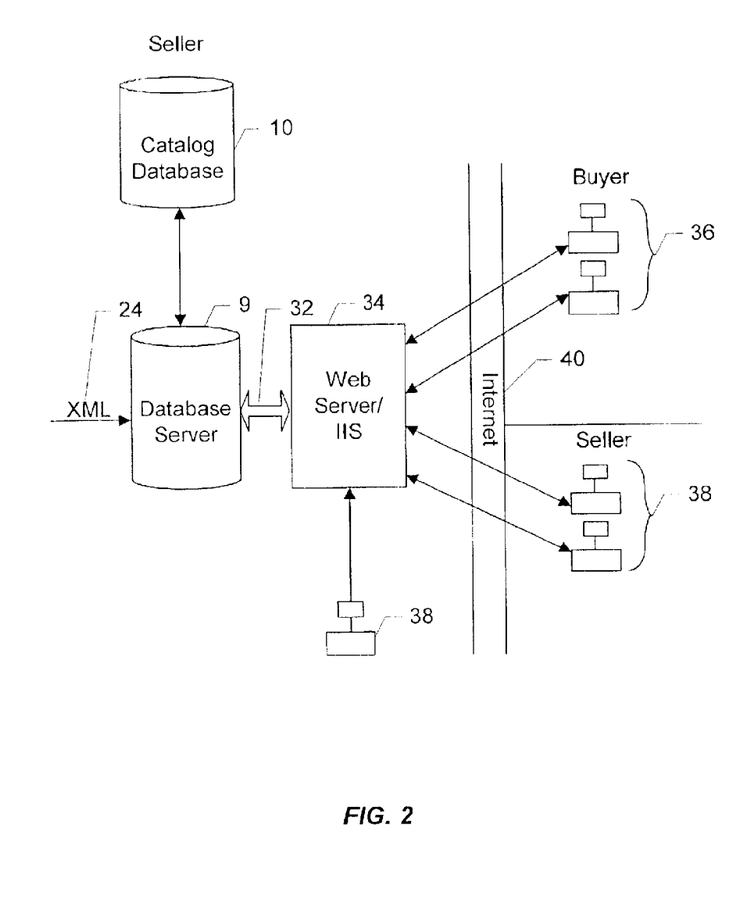
FIG. 2 shows one embodiment of a system in which the logic and constraint based hierarchy of the invention can be employed.

One embodiment of the invention is presented with reference to FIG. 2. Catalog database 10 contains the most recent version of the catalog data assembled and maintained by the seller. The catalog data stored in the database 10 is accessed through queries made to database server 9. Database server 9 can be any server capable computer, including one capable of running SQL Server 7 by Microsoft. Item information can be imported into database 10 via import input 24 from manufacturers and vendors of products sold by seller. A format such as XML (extensible Mark-up Language) can be used to represent the imported data for easy manipulation and conversion.

Users authorized by the seller may be given access to the database 10 through an application program running on application server 8, which is in communication with the database server 9 through communications bus 32. The application server 8 can be any server capable computer, including a PC server capable of running the Windows NT operating system available from Microsoft Corporation. Updates to and maintenance of database 10 can be made directly by the seller-authorized users through the application program. In one embodiment of the invention, the application server 8 communicates with database server 9 over bus 32 using TCP/IP communications protocol and JDBC/ADO database protocols.

The set of nodes and the arbitrary rules used to define the scope of the subset of catalog data to be included at each node of the browse hierarchy is created by seller-authorized users through terminals 38 coupled to application server 8. The constraints are physically stored with (although maintained independently from) the catalog data in database 10. For each leaf node activated during the browse process, the application aggregates the constraints specified by the leaf node and all of its ancestors into a single "include" rule. The application then derives a database search query from the "include" rule and communicates the query to the database server 9. The database server 9 executes the query and retrieves the subset of the catalog data that meets the aggregated constraints for the leaf node activated during the browsing process. The database server 9 returns the subset of the catalog information in the form of a list of item SKUs, along with any ancillary marketing text or image data associated with each of the returned SKUs. In one embodiment, the data is presented for display on the user's terminal from which the browsing is conducted. where a user is browsing the hierarchy over the Internet using a web browser, the list of retrieved SKUs and any data associated therewith is converted by the application to one or more web pages communicated presented to the user based on the query initiated by the selection of the leaf node.

In another embodiment, a buyer authorizes users to access the application running on application server 8 over the Internet 40. In this case, the buyer-authorized user accesses the application through web server 12 coupled to browsers 14. Those of skill in the art will recognize that a single server could be used to run both the application as well as the web server application. Once the buyer-authorized user gains access through an Internet Service Provider (ISP), the user contacts the application through web server 12, signs on and is acknowledged as an authorized user by the application. The application then provides the user with web pages that display the browse hierarchy as developed by the seller in accordance with the invention.

The buyer-authorized user can then browse the catalog database by selecting (i.e. activating) nodes in the hierarchy and initiating database queries as previously described. The application provides the results of database searches as initiated by the selection of leaf nodes in the hierarchy as web pages through web server 12 over Internet 40 to be displayed on the user's browser 14. The seller-authorized users can perform hierarchy development and maintenance either over the Internet 40 using a machine such as a PC running a web browser 38, or directly with the application server 8 as previously discussed.

Methodology

As previously discussed, each node has a unique label or name associated with it, each node also contains a list of the names of its children. Optionally, each node specifies attribute-value based constraints as well as marketing text or image data that can be displayed upon activation of the node. In one embodiment, the general form of the constraints specified at each node might be All items where:

```
       [ATT_Name op ATT_Val
 (AND)     [ATT_Name opATT_Val]
     ];
``` where ATT_Name is an attribute identifier, op is an operator {=, >, <, "starts with" or "contains"}, ATT_Val is the value of the attribute, and the AND is an implicit operator between all of the constraints specified by the node.

Also as previously discussed, in one embodiment when a leaf node is activated, a rule is generated that includes all of the constraints as specified for the leaf node and each of the nodes that are ancestors of the leaf node. Just as the constraints for each node are implicitly ANDed together, so are the constraints between nodes. The rule for the entire browse path between the selected leaf node and the root takes the general form of either an include (INC) or exclude (EXC). In one embodiment, the rule is an INC based rule and takes the general form:

```
INC
    All items where:
        [ATT_Name op ATT_Val
  (AND)    [ATT_Name op ATT_Val]
              . . .
        ];
```

Figure 3:
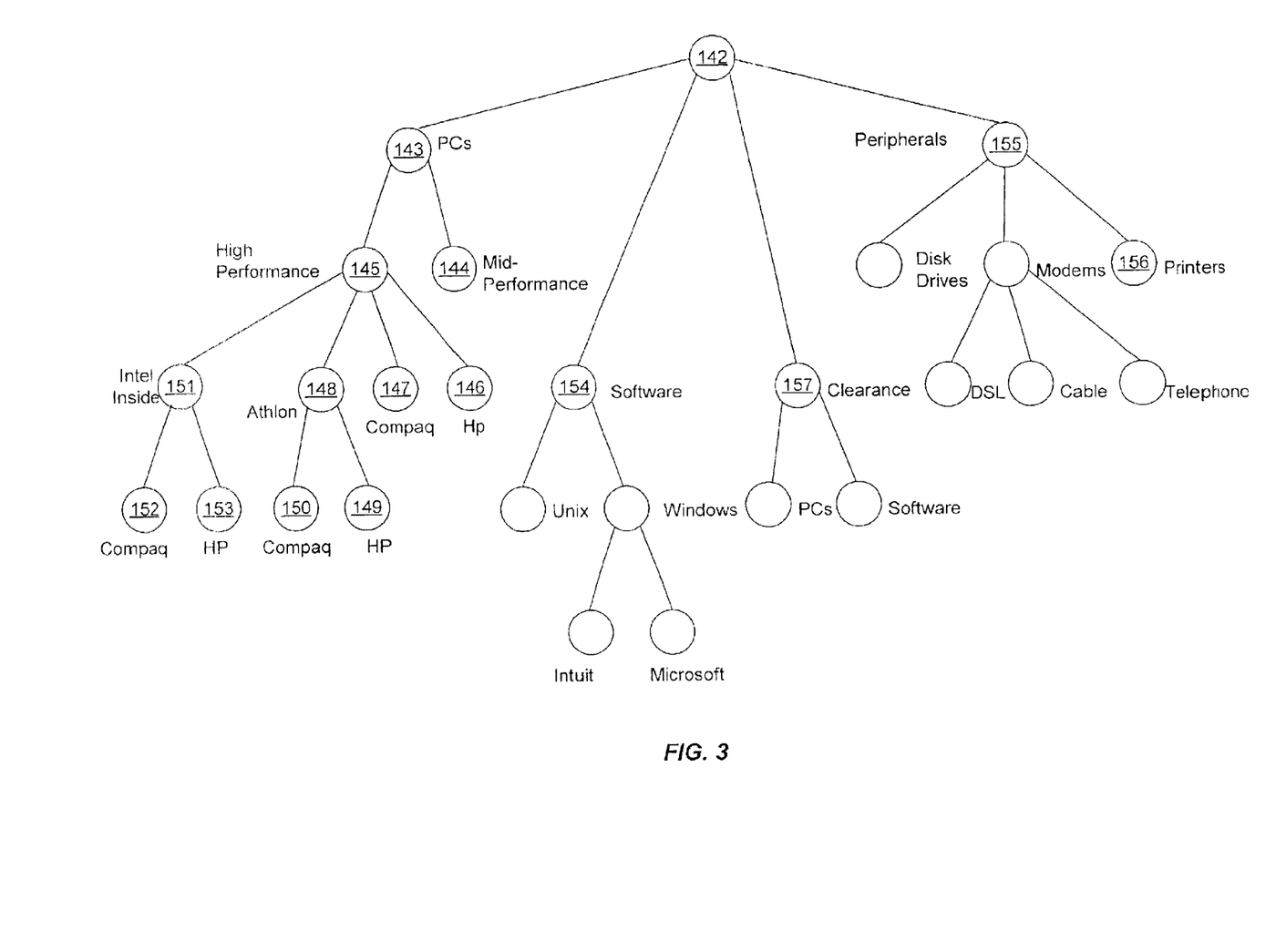
FIG. 3 provides one possible example of a logic and constraint-based hierarchy that might be employed in accordance with the invention.

One example of a hierarchy that might be developed by a seller-authorized user in accordance with the method of the invention is illustrated in FIG. 3. At the top of the hierarchy is a root node 142 that typically is labeled "the root" and typically does not specify constraints associated with it. This is because for a typical implementation, the root node will represent all items in the database. In fact, if the root node 142 does specify constraints, the hierarchy will likely not represent or span the scope of the entire database. One example where this might be desirable is in the event that items in the database are associated with a date-stamp attribute indicating when they were added to the database. The root node could, for example, constrain the items falling under it as only those items that were added more than three days prior to the current date.

In the alternative, if the root node does not specify any constraints, than by default it specifies a logical grouping of all items in the database as defined by its children. This is a powerful tool for expression because the items may then be grouped arbitrarily under the root node into any combination of nodes that the seller desires. With respect to FIG. 3, the items are grouped into the categories of: "PCs," "Peripherals," "Software," and "Clearance Specials." The benefit of specifying such a logical grouping at any node is significant. First, it is equivalent to the implicit logical ORing of several disparate attributes. It does so without requiring any database query to reflect the function, and thus does not burden the database server with its execution. Second, it permits the seller to classify the items into arbitrary groups under it as the seller sees fit. The root 142 may also have some optional marketing text or image information associated with it so that the data may be displayed to the user's browser prior to the user browsing the catalog database.

The next level of the example hierarchy of FIG. 3 includes the logical grouping of nodes labeled "PCs" 143, "Peripherals" 155, "Software" 154 and "Clearance Specials" 157 as previously noted. Each of these nodes includes the list of their respective children as previously discussed. If the items that fall under any of these nodes can be expressed as one or more logically ANDed constraints based on attribute values associated with the items in the database, they are so specified. For nodes such as PCs 143 and Software 154, if these labels also represent product types for example, then the items that fall under them can be specified by node constraints such as: "all items having PRODUCT TYPE=PC" and "all items having PRODUCT TYPE=Software" respectively. For a node such as Clearance Specials 157, however, there may be no such attribute ascribed to any items in the database. Thus, the nodes that fall under it will themselves be a logical grouping.

The node labeled "PCs" 143 has as its list of children nodes labeled "High-performance" 145 and "Medium Performance" 144. In one embodiment, these nodes will be displayed if the buyer-authorized user selects the "PCs" 143 node. For these nodes, constraints can be specified by the seller to describe the items that would fall under either of these nodes in the hierarchy. For example, the constraint for node 145 might be "all items where Processor Clock Speed>1 GHz". To continue down a browse path, a constraint for node 151 might be "all items where PROCESSOR VENDOR=Intel" and for node 152 might be "all items where PC VENDOR=Compaq".

Thus, in the case of the example hierarchy of FIG. 3, the rule defining of all items that fall under the leaf node "Compaq" 153 with its aggregated constraints could be expressed as:

```
INC
    All parts where:
        [Product type = 'PC'
         AND   [Processor clock speed > '1 GHz'
                AND   [Processor Vendor = 'Intel'
                       [PC Vendor = 'Compaq']
                      ]
               ]
        ]
```

An example of aggregated node constraints by which to include all software that is A manufactured by Microsoft Corporation and is related to "Windows" under leaf node 159 could be expressed as follows:

```
INC
    All parts where:
        [Product type = 'software'
               [Description "starts with" 'Windows'
                      [Vendor = 'Microsoft']
               ]
        ]
```

A database query is created by the application running on the application server from these INC rules, and the database query is issued to the database server. The database server searches the database in accordance with the constraints specified by the rules and returns a set of SKUs to the application server. The application then converts the data returned by the search to pages that can be displayed on the user's computer. In the case of an embodiment accessed over the Internet, the search results data is converted into web pages that are transmitted to the user over the Internet by the web browser. The pages are received by the user's browser, and displayed by the browser on the user's terminal.

It can be seen from the example hierarchy of FIG. 3 that the invention provides far more flexibility and expressiveness than prior art browsing hierarchies. For example, the user has the option to browse high-performance Compaq personal computers either through a level that further refines the PCs based on processor vendor (i.e. through browse path nodes 143, 145, 151 and 152), or directly from the high-performance node (i.e. through browse path nodes 143, 145 and 147). In former case, the SKUs returned by selecting the leaf node will include only those PCs that are made by Compaq and employ an Intel processor operating at a clock speed greater than 1 GHz. In the latter case, the SKUs will be all PCs made by Compaq running at over 1 GHz. Thus, it can be seen that the items represented by the SKUs in the first case will also be included in the set of SKUs returned by the second case. There are two paths by which the SKUs in the first set are browsed. Moreover, some of those SKUs may also end up returned by selecting the "PCs" node under the "Clearance" node.

One example of the more flexible nature of the invention is that the particular levels in the hierarchy are not rigidly assigned to one attribute or product type for differentiation. For example, the second level of the hierarchy for PCs splits based on processor performance, whereas for software, the split is based on operating system type. With respect to peripherals, the second level of the hierarchy splits on product categories. Thus, the seller is not constrained to follow some rigid and predetermined hierarchical format.

Another example of the flexibility of the invention permits arbitrary logical groupings to be made where convenient. For example, the "Peripheral" 155 and "Clearance" 157 nodes are not likely discernable on the basis of rules based constraints; the seller will not likely alter the database to add a clearance attribute to items that are occasionally priced for clearance. Yet, this hierarchical category can be arbitrarily established using the invention. In fact, the entire hierarchy under the Clearance node 157 may be a logical grouping that specifies the SKUs outright for those PCs and those software programs that have been placed on clearance.

In FIG. 4, a screen shot is presented that provides one example of how the hierarchy for a particular catalog database may be developed by a seller-authorized user. The nodes are represented as folder icons and selecting one of the node icons will reveal child nodes if any. The existence of child nodes is indicted by the plus signs that are associated with each node icon. The screen illustrates that the "cables" node icon has been selected, and all of the children for the "cables" node are now displayed with a slight indentation to their parent. The node is named using the "Node Name" text box. Marketing text to be associated with selecting this node can be entered in the "Marketing Text" text box. A marketing image can also be included with the marketing text by specifying a URL from where the image can be retrieved. The constraints associated with this node are specified as an attribute identifier (e.g. "Product Type"), an operator between the attribute and the attribute value (e.g. "Equal") and a value for the attribute (e.g. "cable"). Thus, selecting this node will display any marketing text entered, any marketing image specified, and if a leaf node in the hierarchy, a set of SKUs that meet the criterion of having a product type attribute equal to cable. The browser interface of FIG. 4 will also display the current aggregation of constraints for each node being created or selected, so the user can more easily ascertain the constraints if any that should be applied to the node to achieve the desired rule for the leaf node in the path.

Those of skill in the art will recognize that regardless of whether the custom catalog subsets are provided to buyers through export to offline web sites or procurement networks, or directly through on-line extranets, the method and apparatus of the present invention makes it far easier on the seller to publish custom catalogs for its various buyers. The seller need only create and maintain a common catalog database in one physical location that represents the superset all available goods/services offered by the seller. The seller then simply establishes a set of rule based searches, one for each buyer or buyer organization, and then generates the custom subset of the superset by executing the searches and returning a set of SKUs for each buyer. If the database is updated, the seller need only run the established sets of rules to publish updated custom catalogs for each buyer. If the relationship between seller and buyer evolves and requires a different scope of products or services to be included in that buyer's catalog, only the set of rules needs to be altered, at which point the buyer's catalog is simply regenerated using the same database.

The above embodiments illustrate but do not limit the invention. In particular, the invention is neither limited by the types of computers used as servers, nor the operating systems, web server or database server application software running on such servers. The invention is limited neither by the types of user terminals used to connect to the servers, nor the type of browser software resident on the terminals. The invention is neither limited by the structure of the data as stored in the database, nor is it limited by the nomenclature used in identifying data types and attributes. The invention does not have to be implemented using the Internet, but rather may be implemented over any network, using any type of transmission protocol and display formats.

Many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries. Other embodiments and variations are within the scope of the invention, as defined by the appended claims.

What is claimed is:

1. A hierarchy for representing a plurality of items stored in a database, said hierarchy comprising:
   a plurality of nodes each representative of a subset of the items; and wherein:
      each of the nodes is a child of one other node, except for a root node, which is a child of no other node and is an ancestor of all of the nodes;
      a first portion of the nodes each specify one or more constraints defining a scope of the subset of items represented by each of the first portion relative to their parent node; and
      a second portion of the nodes specify no constraints, each of the second portion establishing a logical grouping defining a scope of the subset of the items represented by each of the second portion.

2. The hierarchy of claim 1 wherein the nodes of the second portion have one or more child nodes, each representative of some portion of the subset items that are logically grouped.

3. The hierarchy of claim 1 wherein the scope of the items represented by each of the nodes is constrained by an aggregation of any constraints specified by the node and all of its ancestors.

4. The hierarchy of claim 3 wherein the aggregation of any constraints comprises a logical ANDing of all of the constraints aggregated.

5. The hierarchy of claim 4 wherein the aggregation of constraints comprises a search rule that includes all of the items that meet the aggregation of constraints.

6. The hierarchy of claim 5 wherein:

a third portion of the nodes are leaf nodes, each of the leaf nodes having no children; and said hierarchy operable to determine the aggregation of constraints and to generate the search rule for each leaf node in response to activation of the leaf node.

7. The hierarchy of claim 1 wherein the constraints comprise one or more permissible values of one or more attributes of the items.

8. The hierarchy of claim 1 wherein the attributes and attribute values are stored with the items in the database.

9. The hierarchy of claim 1 wherein each of the nodes specifies a unique label and a list of the unique labels of its children.

10. The hierarchy of claim 1 wherein one or more of the nodes specifies a set of display data.

11. A method of representing a plurality of items in a database hierarchically, each of the items associated with one or more attributes, each of the attributes having one or more values, said method comprising:

apportioning the plurality of items into subsets;

representing each of the subsets with a node in a hierarchy, each of the nodes being a child of one other node, except for a root node, which is a child of no other of the nodes and is an ancestor of all of the nodes in the hierarchy;

specifying one or more constraints for each of a first portion of the nodes, the constraints defining a scope of the subset of items represented by each of the first portion relative to their parent node; and establishing a logical grouping of the items for a second portion of the nodes, the logical grouping defining a scope of the subset of items represented by each of the second portion of nodes, no constraints being specified for any of the second portion of the nodes.

12. The method of claim 11 wherein the nodes of the second portion have one or more child nodes, each representative of some portion of the subset of the items that are logically grouped.

13. The method of claim 11 wherein the scope of the items represented by each of the nodes is constrained by an aggregation of any constraints specified by the node and all of its ancestors.

14. The method of claim 13 wherein the aggregation of any constraints comprises a logical ANDing of all of the constraints aggregated.

15. The method of claim 14 wherein the aggregation of constraints comprises a search rule that includes all of the items that meet the aggregation of constraints.

16. The method of claim 15 wherein:

a third portion of the nodes are leaf nodes, each of the leaf nodes having no children; and said hierarchy operable to determine the aggregation of constraints and to generate the search rule for each leaf node in response to activation of the leaf node.

17. The method of claim 11 wherein the constraints comprise one or more permissible values of one or more of the attributes of the items.

18. The method of claim 11 wherein the attributes and attribute values are stored in conjunction with the items in the database.

19. The method of claim 11 wherein each of the nodes specifies a unique label and a list of the unique labels of its children.

20. The method of claim 11 wherein one or more of the nodes specifies a set of display data.

21. A method of browsing items stored in a database using a hierarchy, each of the items associated with one or more attributes, each of the attributes having one or more values, said method comprising:

apportioning the plurality of items into subsets;

representing each of the subsets with a node in a hierarchy, each of the nodes being a child of one other node, except for a root node, which is a child of no other of the nodes and is an ancestor of all of the nodes in the hierarchy;

specifying one or more constraints for each of a first portion of the nodes, the constraints defining a scope of the subset of items represented by each of the first portion; and establishing a logical grouping of the items for a second portion of the nodes, the logical grouping defining a scope of the subset of items represented by each of the second portion of nodes, no constraints being specified for any of the second portion of the nodes;

displaying said hierarchy on a computer terminal, wherein each of said nodes are operative to be activated by selecting the node;

aggregating the constraints specified by a leaf node and its ancestors in response to selection of one of the leaf nodes;

forming a search rule from the aggregation that includes all items that meet the constraints;

initiating a search of the database in accordance with the search rule; and returning to the terminal a list of the items that meet the constraints.

22. The method of claim 21 wherein the terminal is connected to the database over a network.

23. The method of claim 22 wherein the network is the Internet.

* * * * *